T. S. OWENS.
METHOD OF AND APPARATUS FOR MAKING SHEET GLASS.
APPLICATION FILED AUG. 11, 1917.

1,358,390.

Patented Nov. 9, 1920.
4 SHEETS—SHEET 1.

INVENTOR
Thomas S. Owens,
By J. F. Rule,
His attorney.

T. S. OWENS.
METHOD OF AND APPARATUS FOR MAKING SHEET GLASS.
APPLICATION FILED AUG. 11, 1917.
1,358,390.
Patented Nov. 9, 1920.
4 SHEETS—SHEET 2.
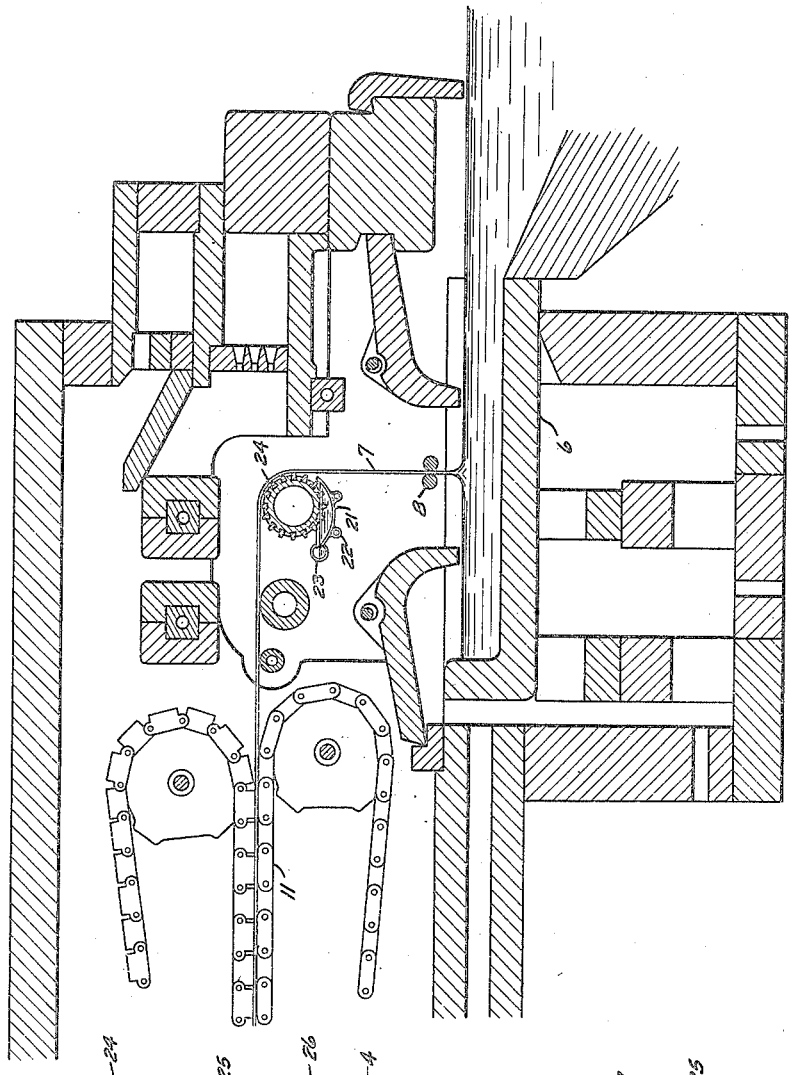
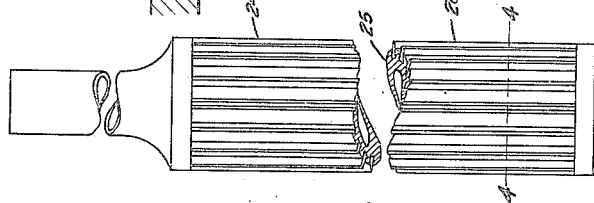
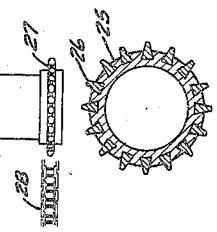
INVENTOR
Thomas S. Owens,
By J. F. Rule.
His attorney.

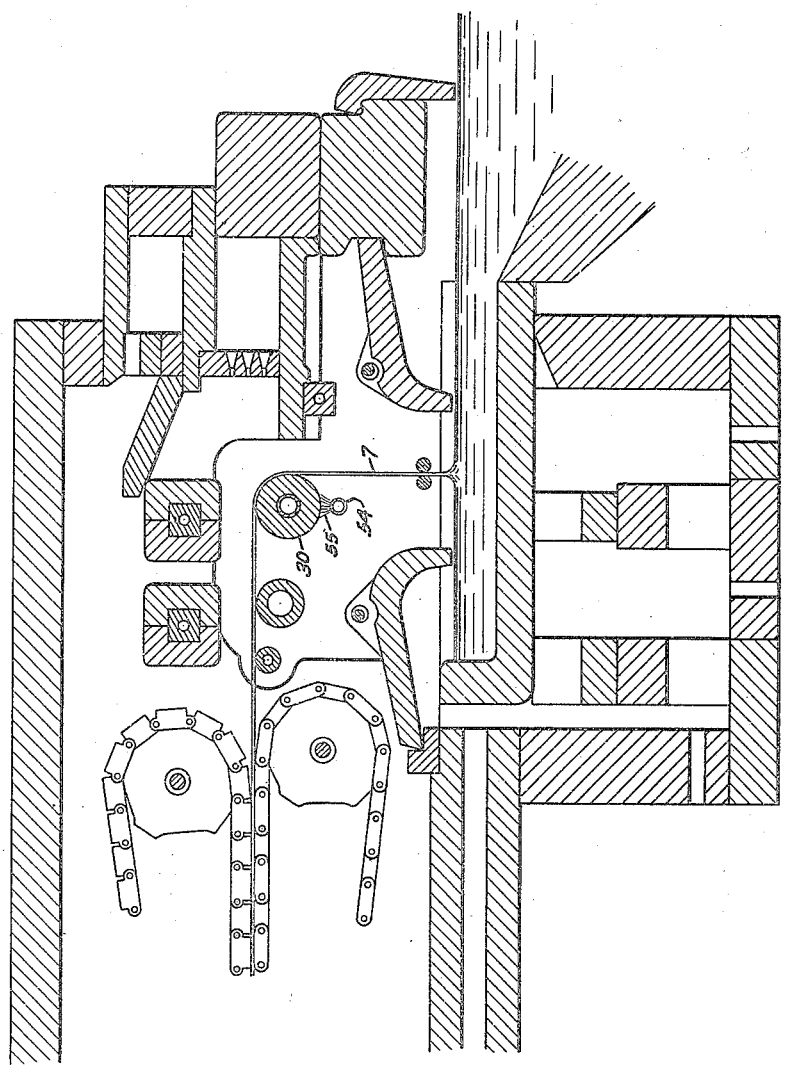

T. S. OWENS.
METHOD OF AND APPARATUS FOR MAKING SHEET GLASS.
APPLICATION FILED AUG. 11, 1917.
1,358,390.
Patented Nov. 9, 1920.
4 SHEETS—SHEET 4.
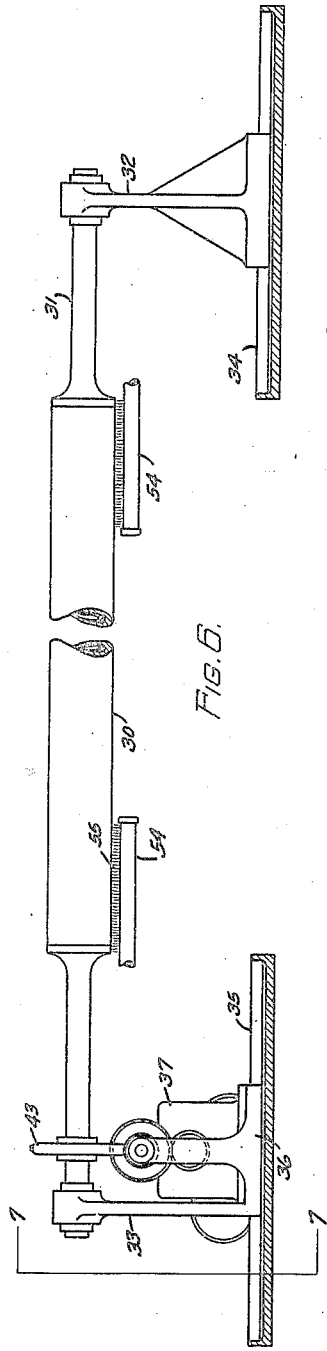
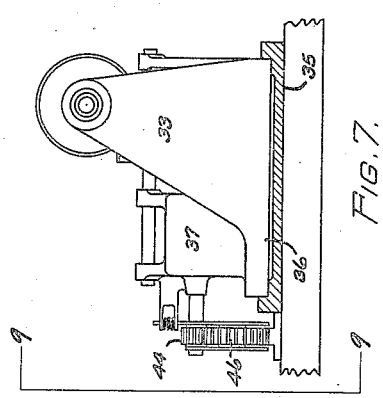
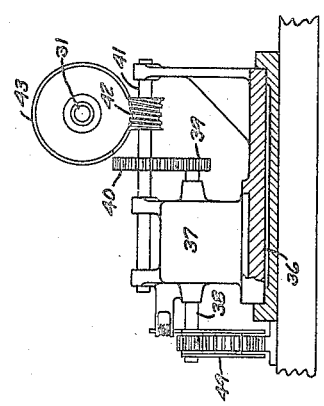
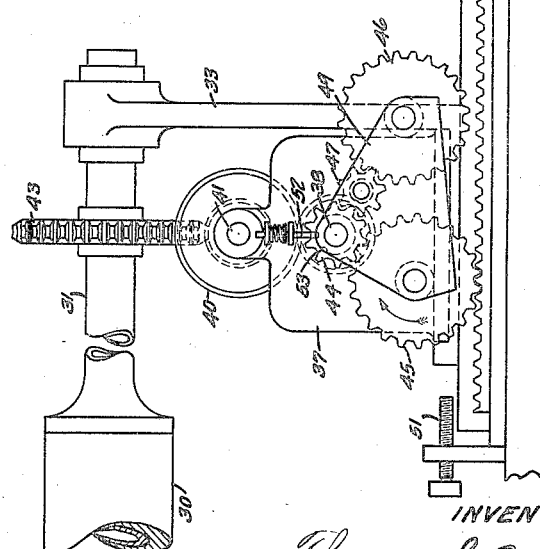
INVENTOR
Thomas S. Owens.
By J. F. Rule.
His attorney.

UNITED STATES PATENT OFFICE.

THOMAS S. OWENS, OF TOLEDO, OHIO, ASSIGNOR TO THE LIBBEY-OWENS SHEET GLASS COMPANY, OF TOLEDO, OHIO, A CORPORATION OF OHIO.

METHOD OF AND APPARATUS FOR MAKING SHEET-GLASS.

1,358,390.   Specification of Letters Patent.   Patented Nov. 9, 1920.

Application filed August 11, 1917. Serial No. 185,754.

*To all whom it may concern:*

Be it known that I, THOMAS S. OWENS, a citizen of the United States, residing at Toledo, in the county of Lucas and State of Ohio, have invented new and useful Improvements in Methods of and Apparatus for Making Sheet-Glass, of which the following is a specification.

My invention relates to apparatus for use in the manufacture of sheet glass by the method which consists in drawing a sheet of glass upward from a pot of molten glass and bending or deflecting the sheet to a horizontal direction in which it is carried through an annealing oven.

When a sheet of glass is drawn from the molten mass, the surface is cooled by the air so that a glaze is formed which is as perfect as any that could be produced by polishing or other artificial means. The sheet of glass, however, is soft and plastic until it has been drawn a considerable distance from the source of supply. It thus becomes necessary to provide a support over which the glass is drawn and which must be positioned to engage the glass where it is still soft and susceptible to any impression. It has been found in practice that the surface of the glass is always marred by such support. Ordinarily this support consists of a metal bending roll which serves to support the glass and change its direction from vertical to horizontal. Such roll must be run at the surface speed of the glass and the latter takes the impress of every unevenness or irregularity in the surface of the roll, thus lowering the quality of the glass.

An object of my invention is to provide means for bending or deflecting the glass from a vertical to a horizontal direction without marking or marring the surface of the glass. To this end I provide in place of the usual metal bending roll, a bending device consisting of a material which may have a sliding movement relative to the surface of the glass without marring or impairing such surface. For this purpose the bending device may consist of wood, or an equivalent (such as the paste materials commonly used in paste molds), which permits a slipping or relative movement of the surface of the glass over the bending device. The bending device may consist of a roll driven at a higher surface speed than the glass. The roll may be either rotated or reciprocated lengthwise, or may have a combined rotation and reciprocation. To prevent the bending roll from being destroyed by the heat of the glass, my invention provides means for keeping the surface of the roll wet or damp.

Other features and advantages of the invention will appear hereinafter.

In the accompanying drawings, Figure 1 is a sectional elevation of a sheet glass drawing apparatus embodying the principles of my invention.

Fig. 2 is a similar view showing a modified form of bending roll.

Fig. 3 is a plan view of the bending roll shown in Fig. 2.

Fig. 4 is a sectional view of said roll, as indicated by the section line 4—4 on Fig. 3.

Fig. 5 is a view similar to Fig. 1, showing another modification.

Fig. 6 is an elevation partly broken away, of the roll shown in Fig. 5, and mechanism for rotating and reciprocating said roll.

Fig. 7 is a sectional elevation at the line of 7—7 on Fig. 6.

Fig. 8 is a view similar to Fig. 7 but with the standard broken away to show the driving mechanism.

Fig. 9 is a fragmentary elevation showing the gearing for driving the roll.

Figure 1:
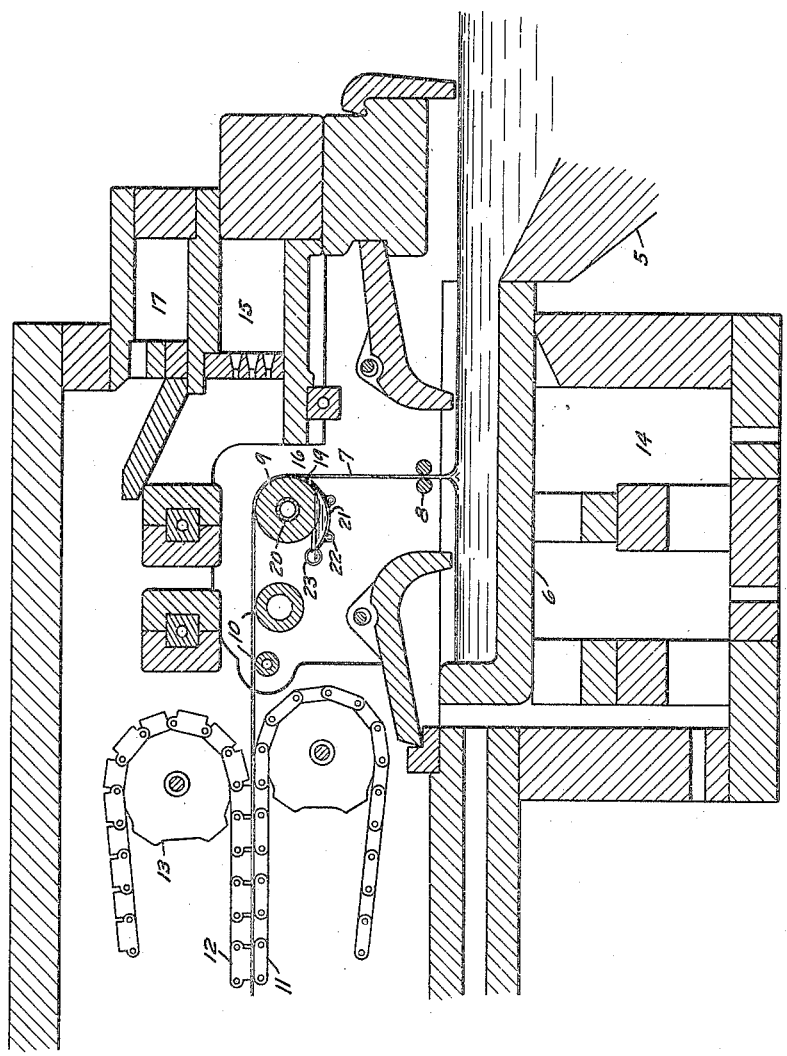

The glass may be melted as usual in a continuous melting tank. From the tank 5 the molten glass runs into a shallow pot 6 from which it is drawn in a continuous sheet 7. The edges of the sheet of glass are drawn between knurled rolls 8 and move vertically upward to the bending roll 9 over which the sheet is bent or deflected to a horizontal position. The sheet is drawn horizontally over supporting rolls 10 and the traveling draw table 11. Clamp bars 12 extending across the sheet of glass are connected to form a continuous conveyer running over sprockets 13. The sheet of glass is drawn horizontally through the annealing oven or leer. The glass in the pot 6 is maintained at the required temperature by a fire chamber 14. A fire box 15 is provided for directing a heating flame against the glass in the bending chamber 16. A fire box 17 may also be provided above the fire box 15. The parts above specified, with the exception of the bending roll, may be substantially like those shown for example in the patent of I. W. Colburn, Method and apparatus for making sheet glass, 1,248,809, December 4, 1917, or of any approved construction.

The bending roll 9 is preferably made of wood and may be mounted on a metal shaft 20 by which the roll is driven at a higher surface speed than that of the glass. The speed of the roll may for example, be three or four times that of the glass. The surface of the roll thus slides over the surface of the glass so that the latter is not roughened or impaired by the roll. This movement of the bending roll at a different surface speed from that of the glass is permitted by the use of wood or other equivalent material such as commonly employed in so called paste molds.

The high temperature of the surrounding air and the heat of the glass would very quickly destroy a wooden roll or any of the equivalent materials which permit a sliding movement of the roll over the surface of the glass. To avoid this difficulty I employ a cooling bath of water or other liquid which may be contained in a trough 21. The water is admitted through supply pipes 22 which may communicate with the interior of the trough through suitable openings provided at intervals along the trough. A continuous flow of water is maintained, an overflow pipe 23 being provided so that the level of the water in the trough remains constant. By this arrangement the bending roll is prevented from over-heating and has its surface kept damp. The hot glass coming in contact with the wet surface of the roll converts the water into steam thus tending to form a thin cushion of steam between the glass and roll. The cushion of gas on which the glass is thus supported, reduces the friction and further reduces any tendency of the roll to mar or distort the surface of the glass. If an excess of water is carried up between the bending roll and the glass it has an injurious effect on the glass. This is due mainly to the excessive pressure of the confined steam generated between the roll and the glass. To avoid this difficulty, I provide a wiper 19 arranged to bear against the roll above the surface of the water. This wiper is made of any suitable heat resistant material and may be mounted on the pan 21 where it will be kept cool by the continuous circulation of water over its lower surface.

Figs. 2 to 4 show a modified form of bending roll 24. This roll may comprise the cylindrical metal base 25 and a series of parallel wooden slats 26 extending lengthwise of the roll and spaced at short intervals around the periphery thereof. These slats may be retained in dove-tail grooves in the metal base 25 or otherwise attached to said base. The sheet of glass as it passes over the bending roll 24 is supported on the wooden slats 26. The roll shaft may be provided with a sprocket 27 on which runs a sprocket chain 28 whereby the roll is driven in synchronism with the draw table 11 but at a higher surface speed, as described in connection with the roll 9. The operation of the roll 24 is substantially similar to that of the roll 9. The spaced slats 26, however, serve to permit the escape of any excess of steam which otherwise might be pocketed between the roll and sheet of glass and produce an uneven or undue pressure on the glass.

Figs. 5 to 9 illustrate a modification in which the bending roll is of greater length than the width of the sheet and has a combined rotary and reciprocating movement.

The roll 30, preferably made of wood, is mounted on a shaft 31 journaled in standards 32 and 33, said standards mounted to reciprocate in guideways 34 and 35 as the roll is reciprocated in the direction of its length. The standard 33 is formed on a traveling base or carriage 36 on which is mounted an electric motor 37 for driving the roll 30. A pinion 39 (Fig. 8) on the motor shaft 38 drives a gear 40 on a shaft 41 on which is a worm 42 in mesh with a worm gear 43 fixed to the roll shaft 31. The motor rotates the bending roll through the gear train just described.

In order to reciprocate the bending roll in the direction of its length, a pinion 44 on the motor shaft is arranged to continuously drive gear wheels 45 and 46. The gear 45 meshes directly with the pinion 44, but with the gear 46 through an idler 47 which reverses the direction of rotation of the gear 46. The gears 45 and 46 are journaled in a frame 49 mounted to rock about the shaft 38 to bring either gear into mesh with a stationary rack 48.

With the parts in the position shown in Fig. 9, when the motor is running, the gear 45 rotates in the direction indicated by the arrow and thereby causes the truck 36 to travel to the right so that the motor, gearing, standards 33, 32 and roll 30 are moved to the right until the frame 49 strikes an adjustable stop 50. This swings the frame 49 about its pivot, lifting the gear 45 from the rack and lowering the gear 46 into mesh with the rack. As the gear 46 is rotating in a reverse direction from the gear 45 the parts are carried to the left until the frame 49 strikes a stop 51, again swinging the said frame to bring the gear 45 into mesh with the rack. The frame 49 is yieldingly held by a spring actuated detent 52 which engages notches or holding depressions 53 in the frame for holding the latter in either of its operating positions. It will thus be seen that the bending roll is reciprocated in the direction of its length simultaneously with the rotation thereof.

Although the standard 32 is shown as mounted to reciprocate, it will be understood that the standard may be stationary and the shaft 31 slidable therein. By omitting the gear train 39, 40, 41 and 42, the roll 30 may be reciprocated without being rotated. It will be understood that when the bending device is reciprocated without rotation it may assume other forms, it being in this instance merely necessary to provide a curved bending surface extending through an arc of about 90 degrees.

The bending roll may be kept wet or damp by wetting each end of the roll as it is carried endwise beyond the sheet of glass. The wetting means as shown in Fig. 6 comprises stationary pipes 54 from which a spray of water 55 is directed against the roll. These pipes may be located outside of the furnace or heating chamber through which the glass is drawn. The bending roll is preferably of sufficient length and reciprocated through a sufficient distance to withdraw all portions of the roll from the furnace at each reciprocation, although the length of the roll and the amplitude of reciprocation may be reduced if desired.

Modifications may be resorted to within the spirit and scope of my invention.

What I claim is:—

1. In sheet glass forming apparatus, the combination with means for drawing a sheet of glass from a supply of molten glass, of a direction changing roll over which the sheet of glass is drawn, the surface of the roll in contact with the glass being a substantial distance beyond the point at which the sheet is formed, and means for rotating said roll at a different surface speed from that of the glass.

2. In sheet glass forming apparatus, the combination with means for drawing a sheet of glass from a supply of molten glass, of a direction changing device over which the sheet is drawn, said device being at a substantial distance beyond said supply so that the sheet is formed and drawn through the air before coming in contact with said device, and means to cause a relative sliding movement of the contacting surfaces of the glass and said device in the direction of movement of the glass while in contact with said device, and at a different speed from that of the glass.

3. The combination with means for drawing a sheet of glass from a tank of molten glass, of a direction changing device located at a distance beyond the line of sheet formation and having a curved surface over which the sheet is drawn and by which the direction of the sheet is changed while the glass is soft and plastic, said surface consisting of a material permitting relative sliding movement of the said surface and the surface of the glass in contact therewith while the glass is in said soft, plastic condition, and means to rotate said device and thereby cause said sliding movement.

4. In sheet glass forming apparatus, the combination with means for drawing a sheet of glass from a supply of molten glass, of a direction changing roll over which the sheet of glass is drawn and by which its direction is changed, said roll being at a distance from said supply and means for driving said roll at a higher surface speed than that of the glass.

5. The combination with means for drawing a sheet of glass from a tank of molten glass upwardly through the air without contact with other material until a surface glaze has formed on the sheet, of a direction changing device having a curved surface over which the sheet is then passed and by which the direction of the sheet is changed while the glass is soft and plastic, said surface consisting of a material permitting relative sliding movement of the said surface and the surface of the glass in contact therewith while the glass is in said soft, plastic condition, means to rotate said device and thereby cause said sliding movement, and means to keep said surface of the said device wet and at a low enough temperature to prevent its destruction by the heat of the glass.

6. In sheet glass forming apparatus, the combination with means for drawing a sheet of glass from a tank of molten glass through the air and thereby causing a surface glaze to form thereon, a bending roll over which the glass is then drawn and by which its direction is changed, said roll being at a distance from the supply of glass in the tank, the glass engaging surface of the roll being formed of wood, and means to dampen the roll.

7. In sheet glass forming apparatus, the combination with means for drawing a sheet of glass from a tank of molten glass, and a roll at a distance from the glass in the tank over which said sheet is drawn and by which its direction is changed, said roll having a glass engaging surface consisting of material which may be run in sliding contact with the surface of the hot glass and at a different speed therefrom, and means for driving said roll at a different surface speed from that of the glass.

8. The combination with means to draw a sheet of glass vertically from a pool of molten glass, of a bending roll at a distance above the pool, said drawing means operating to draw the sheet over the roll after a surface glaze has formed on the sheet but while the latter is still soft and plastic, said roll having a glass engaging surface consisting of a material which may be run in sliding contact with the glass while the latter is in said soft, plastic condition without marring the glass, and means to maintain said sliding movement of the glass on the roll.

9. The combination with means for drawing a sheet of glass from a supply of molten glass, of a bending device over which the sheet is drawn and by which its direction is changed, and automatic means to continuously reciprocate said bending device as the glass is drawn thereover.

10. The combination with means for drawing a sheet of glass from a supply of molten glass, of a bending device over which the sheet is drawn and by which its direction is changed, and automatic means to reciprocate said bending device in a direction transverse to that in which the sheet is drawn thereover.

11. The combination with means for drawing a sheet of glass from a supply of molten glass, of a bending device over which the sheet is drawn and by which its direction is changed, a motor, gearing between the motor and said bending device for moving the latter transversely of the sheet of glass, and automatic reversing mechanism for periodically reversing the direction of movement of the bending device.

12. The combination with means for drawing a sheet of glass from a supply of molten glass, of a wooden bending device over which the sheet is drawn and by which its direction is changed, and automatic means to reciprocate said device.

13. The combination with means for drawing a sheet of glass from a supply of molten glass, of a bending roll over which the sheet is drawn and by which its direction is changed, and automatic means for simultaneously rotating said roll and reciprocating it in the direction of its length.

14. The combination with means for drawing a sheet of glass from a supply of molten glass, of a bending roll over which the sheet is drawn and by which its direction is changed, and means for simultaneously rotating said roll and reciprocating it in the direction of its length, said means comprising a motor, a gear train between the motor and roll for rotating it and a second gear train through which motion is transmitted for moving the roll in the direction of its length.

15. The combination of a glass sheet bending device, a uni-directional motor, and gearing between the motor and bending device arranged to reciprocate said device.

16. The combination with means for drawing a sheet of glass from a supply of molten glass, of a bending device over which the sheet is drawn and by which its direction is changed, an electric motor, a truck on which the motor is mounted, a track on which said truck travels, means by which the motor is caused to drive said truck, automatic reversing mechanism by which the direction of travel of the truck is periodically reversed, and means connecting the bending device to move with said truck and thereby reciprocating the bending device in the direction of its length.

17. The combination with means for drawing a sheet of glass from a supply of molten glass, of a bending device over which the sheet is drawn and by which its direction is changed, a heating chamber through which the sheet is drawn and through which the bending device extends, and means for reciprocating the bending device in the direction of its length and thereby causing a sheet engaging portion thereof to be periodically projected beyond the side of said chamber.

18. The combination with means for drawing a sheet of glass from a supply of molten glass, of a bending device over which the sheet is drawn and by which its direction is changed, a heating chamber through which the sheet is drawn and through which the bending device extends, and means for reciprocating the bending device in the direction of its length and thereby causing a sheet engaging portion thereof to be periodically projected beyond the side of said chamber, and means located outside of said chamber for wetting said projected portion of the roll.

19. The combination with means for drawing a sheet of glass from a supply of molten glass, of a bending device over which the sheet is drawn and by which its direction is changed, a heating chamber through which the sheet is drawn and through which the bending device extends, and means for reciprocating the bending device in the direction of its length, said bending device being of such length and reciprocated through a sufficient distance to cause all parts of its sheet engaging surface to be carried outside of the heating chamber during each complete reciprocation of said device.

20. The combination of means for drawing a sheet of glass from a supply of molten glass, a bending device over which the sheet is drawn and by which its direction is changed, a compartment containing heated air through which the portion of the bending device in contact with the glass extends, the length of said bending device being more than double the width of said compartment, and means for reciprocating the bending device in the direction of its length through a distance more than the width of the sheet so that all portions of the surface of said bending device are withdrawn from the said compartment at each reciprocation, and means for wetting the exposed surface of the bending device.

21. The combination with means to supply molten glass, of a sheet bending roll means beyond the roll to draw a continuous sheet of glass vertically upward through the air to the roll and thence horizontally with the upwardly moving surface of the glass from said supply to the roll free from contact with any extraneous substance, the surface of said roll consisting of a material which may have a sliding contact with the glass without marring the glazed surface thereof, and means to rotate said roll and maintain a sliding contact between the roll and glass.

22. The method which consists in drawing a sheet of glass continuously upward through the air from a pool of molten glass, with the surface of the sheet free from contact with extraneous material until a glaze has formed thereon, bending the sheet over a roll having a surface which will not mar said glaze, and maintaining a sliding contact between said surfaces by rotation of the roll.

Signed at Toledo, in the county of Lucas and State of Ohio, this 9th day of August, 1917.

THOMAS S. OWENS.